June 4, 1946.	B. C. COONS	2,401,463
APPARATUS FOR FEEDING AND STEMMING FRUIT
Original Filed April 8, 1940	3 Sheets-Sheet 2
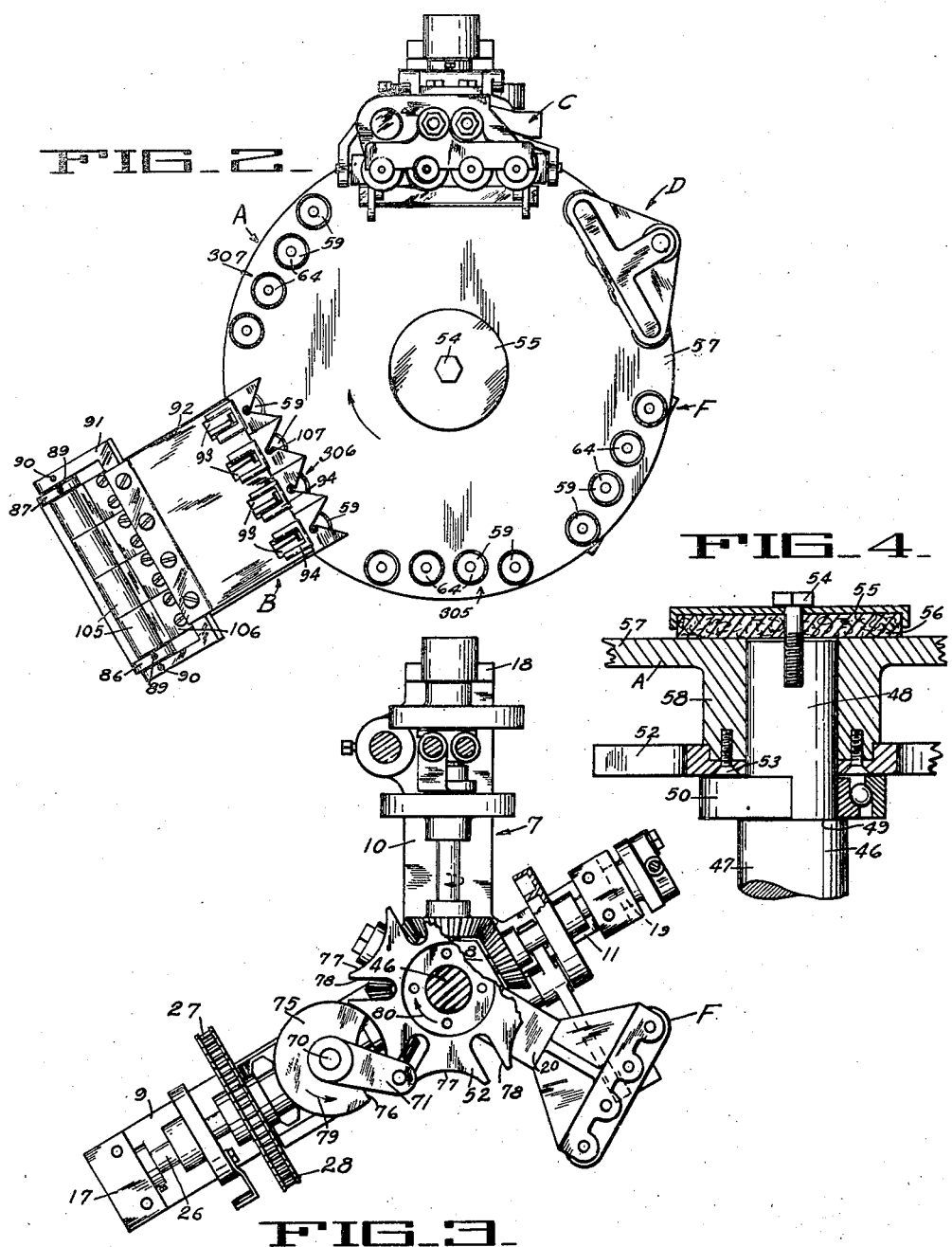
INVENTOR
BURTON C. COONS
BY Philip A. Minnis
ATTORNEY

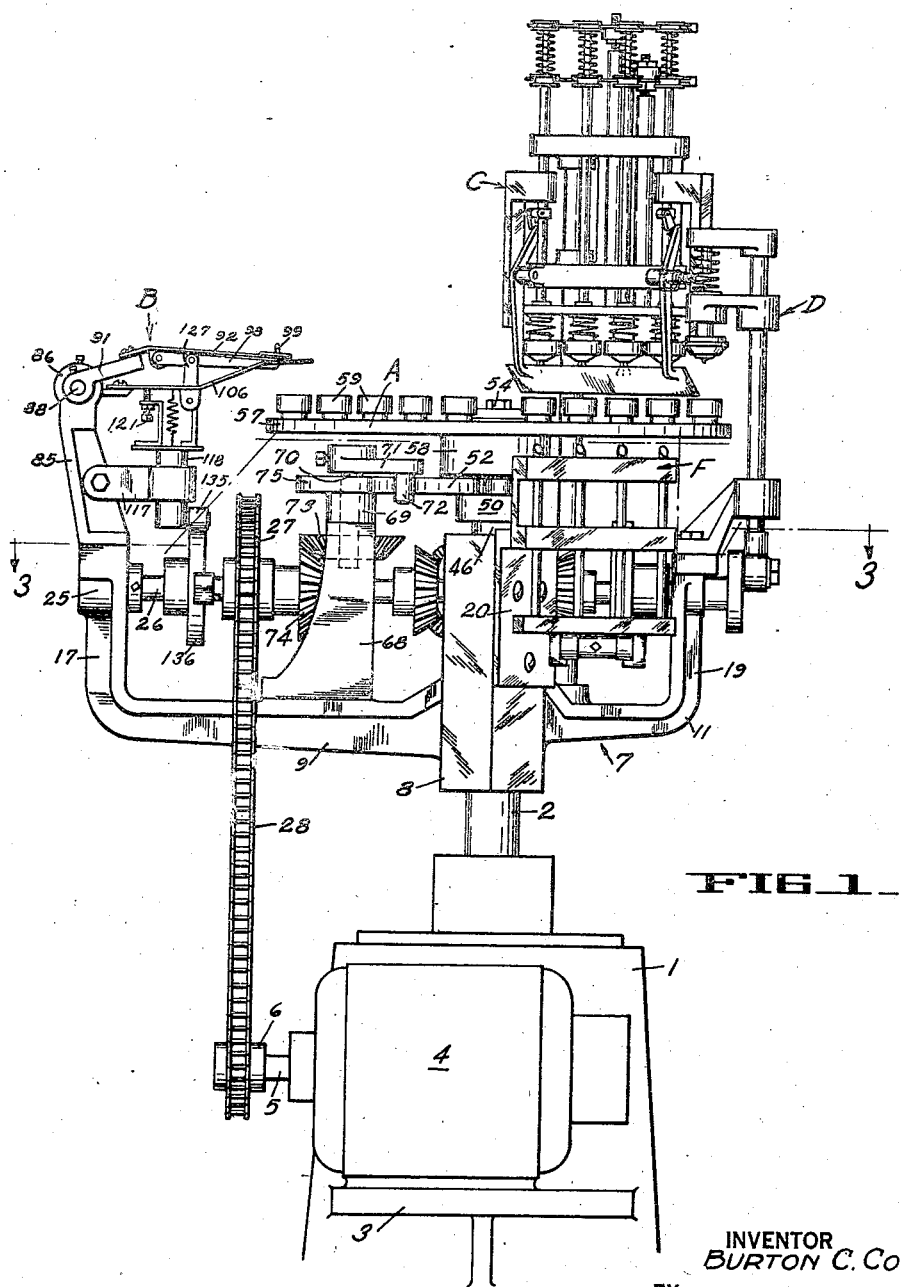

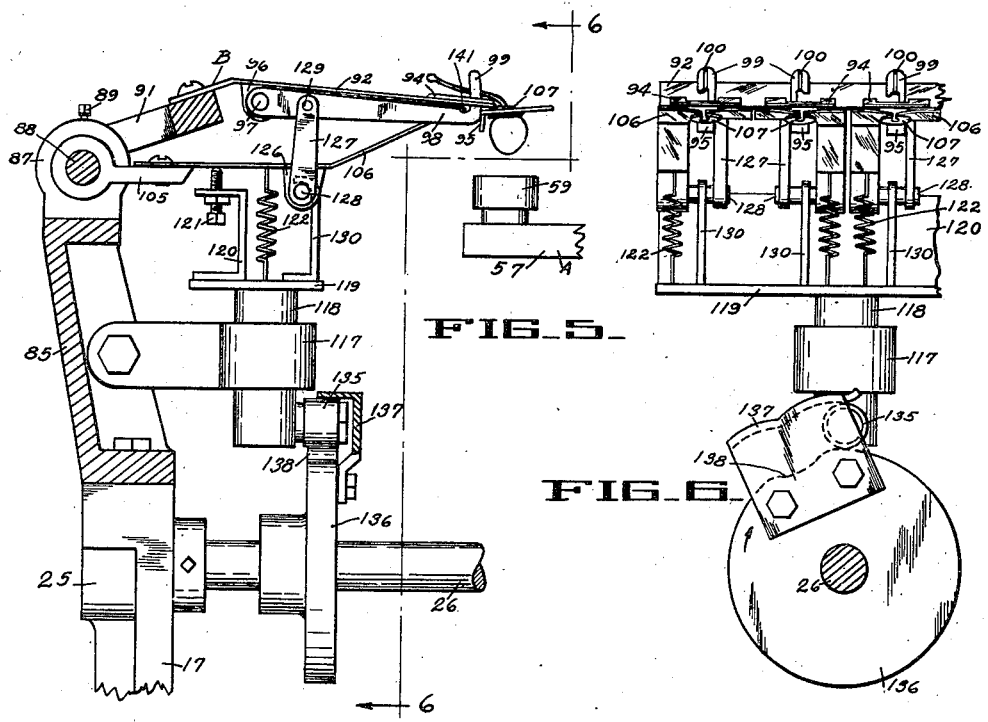
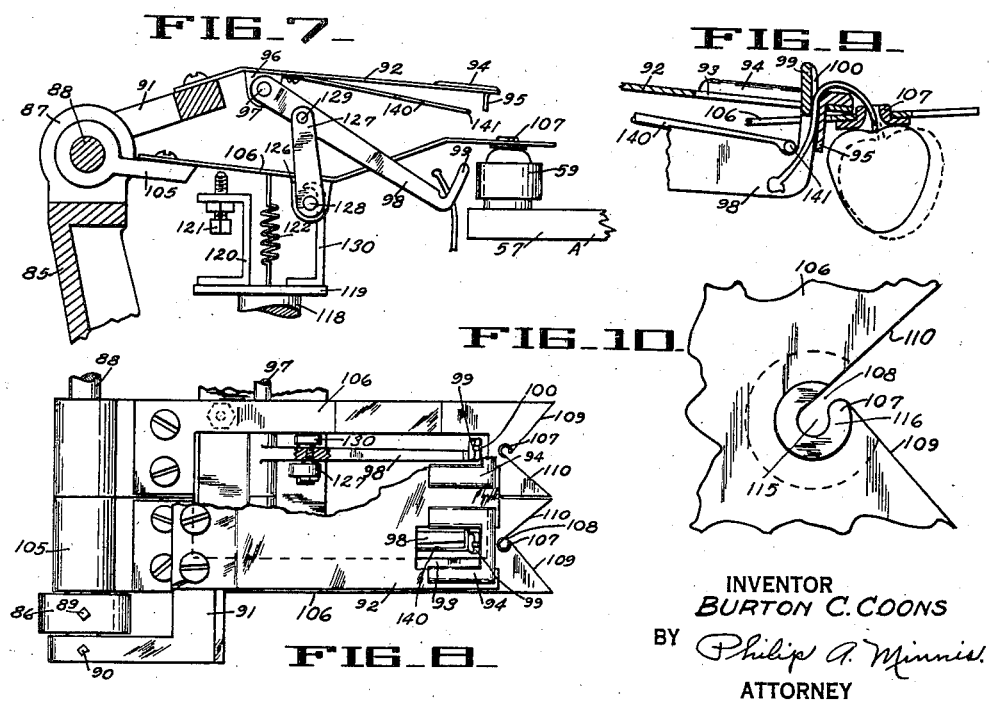

Patented June 4, 1946

2,401,463

UNITED STATES PATENT OFFICE 2,401,463

APPARATUS FOR FEEDING AND STEMMING FRUIT

Burton C. Coons, San Jose, Calif., assignor to Food Machinery Corporation, San Jose, Calif., a corporation of Delaware Original application April 8, 1940, Serial No. 328,479. Divided and this application November 30, 1942, Serial No. 467,319

24 Claims. (Cl. 146—55)

The present invention relates to apparatus for feeding, stemming and orienting fruit such as cherries or the like.

This application is a division of my co-pending application, Serial No. 328,479, filed April 8, 1940, for Method and apparatus for pitting fruit.

One object of the present invention is to provide an improved apparatus for feeding, stemming and orienting cherries in an efficient and speedy manner.

Another object is to provide an apparatus for feeding and stemming cherries without mutilating the fruit.

Another object is to provide a feeding and stemming apparatus for cherry pitting machines which includes means for depositing the stemmed fruit into fruit holding means of a pitting machine in centered relation with respect thereto.

Another object is to provide a cherry feeding and stemming device for stemming cherries and for depositing the stemmed cherries in predetermined position into fruit holding means.

Other and further objects and advantages of the present invention will become apparent from the following description taken in connection with the accompanying drawings in which:

Fig. 1 is a side elevation of the feeding and stemming apparatus of the present invention illustrating it as it may be applied to a cherry pitting machine.

Fig. 2 is a plan view of Fig. 1.

Fig. 3 is a horizontal section of Fig. 1 taken along lines 3—3 thereof, certain parts being shown in elevation.

Fig. 4 is a sectional view of a portion of the machine shown in Fig. 1 illustrating the mounting of the turret associated with the feeding and stemming mechanism of the present invention.

Fig. 5 is a side elevation of the feed mechanism which includes the stemming mechanism and the fruit centering device, certain parts being shown in section.

Fig. 6 is a side elevation of Fig. 5 taken along lines 6—6 thereof certain parts being omitted.

Fig. 7 is a side elevation of the feed mechanism illustrating the position of the parts thereof during the stemming operation.

Fig. 8 is a plan view of Fig. 5, certain parts being broken away.

Fig. 9 is a sectional view of certain parts of the feed and stemming mechanism illustrating the stem of a cherry in locked position preparatory to the stemming operation.

Fig. 10 is an enlarged plan view of one of the fruit centering members of the feed mechanism.

The cherry pitting machine (see Figs. 1 and 2) in connection with which the feeding and stemming apparatus of the present invention has been illustrated consists of a turret A, provided with fruit holding and supporting means, a feed mechanism B, which includes stemming and centering devices, a pitting mechanism C, a reshaping mechanism D and an ejector mechanism F, all of which are operated in timed relation relative to each other by a single source of motive power.

The cherries which are manually inserted in the feed mechanism B are stripped from the stems and oriented incident to the stemming operation, and are thereupon deposited into the fruit holding and supporting means of the turret A in accurately centered position. During the rotation of the turret A, the fruit received and supported thereby is presented to the pitting mechanism C for removal of the pit thereof, and, subsequently, to the reshaping mechanism D for reshaping the fruit to restore its original and attractive appearance. Finally, the turret A presents the pitted and reshaped fruit to the ejector or the discharge mechanism F, which effects the discharge of the finished product from the machine.

The frame structure of the cherry pitting machine in connection with which the feeding and stemming apparatus of the present invention has been illustrated herein comprises a base 1 (see Fig. 1) provided with a standard 2 and a supporting bracket 3, upon which an electric motor 4, provided with a drive shaft 5 and a sprocket wheel 6, is mounted in any convenient manner.

Supported upon the standard 2 and fixed with respect thereto is a spider structure 7, consisting of a hexagonal central body portion 8 and a plurality of horizontally extending spider arms 9, 10 and 11.

The spider arms 9, 10 and 11 extend in radial directions from the body portion 8 and are provided with vertically extending portions 17, 18 and 19 respectively.

The radially extending arm 9 of the spider structure 7 supports the feed mechanism B of the machine which also includes fruit stemming and centering devices. The arm 10 carries the pitting mechanism generally indicated at C, while the arm 11 supports the reshaping mechanism D of the machine.

The ejector mechanism F is likewise carried by the spider structure 7, by means of a supporting bracket 20 attached to the hexagonal body portion 8, as will be seen from Fig. 1.

The vertical portion 17 of the spider arm 9 is provided with a bearing 25, within which one end of a horizontal disposed main drive shaft 26 is positioned. The other end of the shaft 26 is received within a bearing of the hexagonal body portion 8 of the spider structure 7. The main drive shaft 26 carries a sprocket wheel 27 fixed thereto, and a drive chain 28 trained around the sprocket wheels 6 and 27 is provided for imparting rotation to the shaft 26 upon operation of the motor 4.

The upper portion of the hexagonal member 8 of the spider 7 carries a stationary stud shaft 46 (see Fig. 4), comprising a lower portion 47 and an upper portion 48 of reduced diameter. Carried by a flange 49, formed between the stud shaft portions 47 and 48 above referred to, is a roller bearing 50 adapted to support the turret A, and an index plate 52 interconnected therewith by means of screws 53. The turret A and index plate 52 are rotatably positioned upon the upper end 48 of the stud shaft 46, and are held in place by means of a screw 54, a metal washer 55, and a washer of resilient material 56, as clearly shown in Fig. 4.

The turret A consists of a circular table 57 provided with a hub 58, and a plurality of fruit holding and supporting cups 59, mounted upon the upper face of the table 57. These cups are arranged in rectilinear groups positioned along chords of the circle defined by the table 57. Adjacent series of fruit supporting cups 59 are disposed with respect to each other at an angle of 60 degrees, as clearly shown in Fig. 2.

The interior portion 64 of the cups 59 is dished and sufficiently large to accommodate cherries of various sizes. The dished portion is further of such a configuration that the cherries placed therein in centered position will remain in such position during the rotation of the turret A. In other words, the dished fruit receiving portion 64 of the cups 59 is not exactly semi-circular in cross section, but somewhat parabolic, so as to exert a slight wedging action upon the fruit for maintaining the same in proper position therein.

Mounted upon the spider arm 9 intermediate the vertically extending portion 17 and the hexagonal portion 8 of the spider structure 7 is a bracket 68 provided with a bearing 69, adapted to receive a shaft 70 provided at its upper end with an index arm 71 fixed thereto and carrying an index roller 72. Keyed to the lower end of the shaft 70 is a bevel gear 73 intermeshing with another beveled gear 74, keyed to the shaft 26. Fixed to shaft 70, and positioned intermediate the index arm 71 and bearing 69 of the bracket 68, is a locking plate 75 (see Figs. 1 and 3). The locking plate 75 is provided with a cut out portion 76, and is adapted to rotate in unison with the index arm 71, above referred to.

The index plate 52 comprises arcuate faces 77 and elongated radially extending slots 78. During rotation of the index arm 71 in the direction of arrow 79, in Fig. 3, the roller 72 enters one of the elongated slots 78 and causes rotation of the index plate 52 in the direction of the arrow 80, until the arcuate face 77 following said slot is in alignment with the locking plate 75, and locked by the peripheral face of the same against further rotation. At this time the roller 72 leaves the respective slot 78 and the index plate 52 remains in locked position until the roller 72 enters the next slot 78 of the index plate 52 and causes a further rotation of the same.

It will be observed from Fig. 3 that upon entry of the roller 72 into one of the elongated slots 78 of the index plate 52, the cut-out portion 76 of the locking plate 75 will be in such relation with respect to the index plate 52 that rotation thereof, as referred to hereinbefore, is permitted.

The elongated slots 78 are disposed at angles of 60 degrees with respect to each other, corresponding to the angular arrangement of the groups of fruit receiving cups 59, and the arcuate faces 77 are disposed intermediate the elongated slots 78, as clearly shown in Fig. 3.

In view of the arrangement above described, the index plate 52 as well as the turret A are intermittently rotated, and a corresponding advancement of the fruit holding and supporting cups 59 from the feed mechanism B to the pitting mechanism C, reshaping mechanism D, and ejector F is obtained.

Fixed to the vertically extending portion 17 of the spider arm 9 is a bracket 85 (see Figs. 1 and 5) which is provided with spaced bearings 86 and 87 (see Fig. 2). Positioned within the bearings 86 and 87 is a shaft 88, held in fixed relation thereto by means of set screws 89. Mounted upon the shaft 88 and fixed thereto by means of set screws 90 is a U-shaped bracket 91, which carries a top or stem supporting plate 92. The forward end of the top plate 92 extends a slight distance over and above the turret A and comprises a plurality of rectangular openings 93, which are in alignment with the cups 59 of the turret A when the same are in fruit receiving positions. The forward ends of these openings are closed by means of U-shaped members 94, (see Figs. 2 and 8). These U-shaped members are secured to the upper surface of the top plate 92 in any convenient manner, and are provided with depending tongue portions 95 (see Figs. 7 and 9), which are of an arcuate contour in vertical direction.

Depending from the lower surface of the top plate 92 are bearing lugs 96, through which a shaft 97 extends in a transverse direction with respect to the top plate 92 and parallel to the fixed shaft 88.

Rotatably mounted upon the shaft 97 are a plurality of locking arms 98, each one of which is provided with an upwardly and transversely extending hook portion 99, extending through the openings 93 in the top plate 92 when the locking arms are in a position as shown in Fig. 5.

The hook portions 99 of the locking arms 98 are movable in close relation to the depending tongues 95 of the U-shaped members 94. The face of each of these hook portions is circumferential in contour about shaft 97, corresponding to the circumferential contour of the depending tongue portion 95 about the same center. The face of each hook portion is further provided with a groove 100 which extends vertically thereof.

Mounted upon the shaft 88 are a plurality of bearing members 105 which are positioned intermediate the bearing brackets 86 and 87. Each of the bearing members 105 is provided with a stripping plate 106, extending over the cups 59 of the turret A when the same are in fruit receiving position. The free ends of the stripping plates 106 are of a V-shaped configuration and are provided with flanged eyelets 107, (see Figs. 9 and 10) disposed at the apex of the V portions thereof. The eyelets 107 of the stripping plates 106 are disposed in centered relation with respect to the cups 59 when the same are in fruit receiving position, and are provided with an opening 108 for permitting the insertion of the stem of a cherry therein.

The sides 109 of the V-shaped portions of the stripping plates 106 are tangentially positioned with respect to the outer periphery of the eyelets 107, while the sides 110 of the V-shaped portions of the stripping plates are tangentially arranged with respect to the inner periphery of the eyelets 107, which forms a central opening 115 (see Fig. 10). The tangential faces 109 and 110, and the entrance openings 108 of the eyelets 107 of adjacent stripping plates 106, are arranged in reversed position, and the hooks 99 of the locking arms 98 of adjacent stripping plates 106, are arranged in opposite positions with respect to each other.

The front portion 116 of the eyelets 107 adjacent the tangential portions 109 of the stripping plates 106 aids materially in keeping the cherry in proper alignment during the centering and stemming operation, in that it prevents the tilting of the cherry during the stemming thereof. In feeding the machine of the present invention, the operators grasp the stems of two pairs of cherries and pull the same into the V portions of adjacent stripping plates 106. The stems are then bent downwardly under the hook portions 99 of the locking arms 98 into a position as shown in Fig. 5. As soon as the stems of the cherries are positioned under the hook portion 99 of the locking arms 98, the fruit will remain suspended as shown in Fig. 5, due to the frictional engagement between the stem and the U-shaped members 94.

Fixed to the bracket 85, previously referred to, is a bearing bracket 117, within which a shaft 118 is slidably disposed. Mounted upon the upper end of the shaft 118 is a plate 119, provided with a channel member 120 extending transversely of the stripping plates 106, and provided with a plurality of set screws 121, one for each stripping plate 106, for adjusting and positioning the stripping plates in fully raised positions, as shown in Fig. 5.

Secured to the plates 119 and each one of the stripping plates 106 are coil springs 122, tending to force the stripping plates 106 in a downward direction. Each of the stripping members 106 is provided with a depending bearing bracket 126 and an actuating arm 127, pivotally secured thereto by means of a pivot pin 128. The actuating arms 127 are pivotally attached to the locking arms 98 by means of pivot pins 129.

The plate 119, previously referred to, is further provided with a plurality of vertically extending hooks 130, one for each stripping member; each hook 130 being adapted to engage the pivot pin 128 of the actuating arm 127, with which it cooperates.

The lower end of the shaft 118 carries a roller 135, adapted to ride upon a rotary cam 136, mounted upon the shaft 126. The roller 135 is maintained in proper cooperative relation with the cam 136 by means of a roller guide 137, secured to the rotary cam 136. The cam 136 is provided with a depression 138 and the roller guide 137 functions primarily to insure a positive actuation of the stripping plates 106 while the roller 135 travels over the portion 133 of the cam.

All of the stripping plates and their associated mechanisms operate in the same manner and therefore the operation of but one stripping plate 106 and its associated parts will be described.

When the parts of the feed mechanism are in the position shown in Fig. 5, with a cherry suspended thereon in the manner previously referred to hereinabove, the hook 130 of each stemming unit is almost in engagement with the pivot pin 128 thereof, and the set screw 121 holds the stripping plate 106 in intimate contact with the lower front edge of the top plate 92, while spring 122 is tending to pull the stripping plate 106 in a downward direction.

When the cam portion 138, upon rotation of the cam 136, is opposite the roller 135, the shaft 118 will be pulled downwardly by the action of the roller guide 137, imparting a downward pull upon the stripping plate 106 by means of the hook 130 and pivot pins 128. The resulting downward movement of the stripping plate 106 is sufficient to strip the cherry from the stem.

Upon downward movement of the shaft 118 the set screw 121 is moved out of supporting contact with the stripping plate 106, and the spring 122 pulls the latter in a downward direction the remainder of the distance allotted for its travel.

Since the travel of the hook 130 is always less than the travel of the pivot pin 128, the stripping plate 106 may stop at any point in the vicinity of the top of the cup, dependent upon the size of the cherry operated upon.

Incident to the downward movement of the stripping plate 106, the locking arm 98 is also forced downwardly by means of the actuating arm 127, and in view of the fact that the pivot pin 129 of the actuating arm 127 is positioned nearer to the shaft 97 than the pivot pin 128 to the shaft 88, the locking arm 98 will travel a greater distance in a downward direction than the stripping plate 106.

Two results are obtained by the above arrangement, namely the locking of the stem between the hook portion 99 and the U-shaped member 94 during the stripping of the cherry from the stem, and the ejecting of the stem from the vicinity of the feeding station subsequent to the stripping operation.

Referring now to Fig. 9, it will be noted that due to the faster travel of the locking arm 98, with respect to the stripping plate 106, the stem of the cherry will be squeezed between opposing faces of the hook 99 and tongue 95, so as to cause the stem of the cherry to enter into the groove 100 of the hook portion 99, assuring retention of the stem in proper position during the stemming operation.

When the stem has been locked in the manner above described, the downward movement of the stripping plate 106, referred to hereinbefore, will strip the cherry from the stem and place the same into one of the cups 59 positioned thereunderneath and in alignment therewith. Since the cherry is suspended on the stem, which is locked between the hook portion 99 and the U-shaped member 94 during the stemming operation above described, the downward motion of the stripping plate 106 bearing on top of the cherry will straighten any curvature in the stem, and align the stem blossom axis of the fruit substantially coincident to or with the vertical axis of the cup 59, so that proper positioning and centering of the cherry with respect to the cup 59 is obtained.

It should furthermore be noted that the rate of travel of the stripping plate 106 is greater than the rate of travel of the falling cherry stripped from the stem, so that the fruit will be forced into the cup in proper and accurately centered position, without any possibility of movement thereof relative to the stripping plate during the feeding operation above referred to.

After completion of the stemming operation above described, the continued downward travel of the locking arm 98 releases the stem from its clamped position between the hook portion 99 and the U-shaped member 94, and the hook 99 thereupon forces the stem through the opening 93 of the top plate 92. The stem is removed thereby from the feeding mechanism and may be discharged from the machine by means of a chute (not shown) in an obvious manner.

An L-shaped spring 140, mounted to the lower face of each top plate 92, and provided with a transversely extending portion 141, may be preferably employed for dislodging the stem from the locking arm 98 to prevent any possibility of pulling the stem back into the opening 93.

After the stemmed cherries have been deposited into the group of cups designated 306 (see Fig. 2), the index mechanism of the turret A is operated and effects rotation of the turret A so as to move the group of fruit holding cups 306 to the position as shown at 307 in Fig. 2 and to bring the next group of empty cups 305 into alignment with the feeding and stemming mechanism, whereupon the operation of the feeding and stemming mechanism repeats in the same manner as previously described herein.

In this way the cherries are stemmed and fed in centered position to each group of fruit holding cups 59 during the operation of the pitting machine and are subsequently advanced by the turret A past the pitting mechanism C and the reshaping mechanism D, and are finally discharged from the cups 59 by the ejector mechanism F. Since the construction of these latter devices and their associated operating mechanisms form no part of the present invention, further description thereof herein is deemed unnecessary, but if further details are desired reference is made to my aforementioned co-pending application of which the present application is a division.

I desire it to be understood that the present invention is not limited to the particular application or precise details of the construction illustrated, but that various applications, modifications and variations may be resorted to without departing from the spirit or scope of the invention and I deem myself entitled to all such applications, modifications and variations as come within the scope of the claims appended hereto.

Having now described my invention and in what manner the same may be used what I claim is new and desire to protect by Letters Patent is:

1. In a fruit handling machine, in combination, an intermittently rotatable turret, individual fruit holding means on the turret, means for engaging the stem of a fruit for holding the latter in suspended position above said fruit holding means, stripping means for engaging the stem end portion of the suspended fruit, means for moving the stripping means relative to the stem engaging means for stripping the fruit from the stem and for transferring the fruit to the fruit holding means, and means for intermittently rotating said turret in timed relation with respect to the operation of said stripping means.

2. In a fruit handling machine, in combination, a rotatable turret, individual fruit holding means on the turret, means for gripping the stem of a fruit for holding the fruit in suspended position above the fruit holding means, stripping means, means operating said stripping means for engaging the stem end portion of the suspended fruit for stripping the fruit from the stem and for transferring the fruit to the fruit holding means, means associated with the stripping means for centering the fruit with respect to the holding means, means for operating said turret for moving the holding means into alignment with the stripping means in timed relation with respect to the operation of the stripping means.

3. In a fruit handling machine, in combination, a rotatable turret, individual fruit supporting means carried on said turret, stem gripping means for holding the fruit in suspended position above said fruit supporting means, a stripping plate for engaging the stem end portion of the suspended fruit, fruit centering means on said stripping plate, actuating means for moving the stripping plate toward said cups for stemming and centering the fruit and for placing of the same into said supporting means in predetermined position relative thereto, means for operating the turret for moving the fruit supporting means into alignment with respect to said stripping plate in timed relation with respect to the operation of said stripping plate.

4. In a fruit handling machine, in combination, a rotatable turret, individual fruit supporting cups carried on said turret, stem gripping means associated with the turret for engaging the stem of a fruit presented thereto for holding the fruit in suspended position above said fruit supporting cups, a stripping plate for engaging the stem end portion of the suspended fruit, actuating means for moving the stripping plate into stripping engagement with the fruit for removing the latter from the stem thereof and for placing the fruit into said cups, and means for intermittently rotating the turret in timed relation with respect to operation of the stripping plate.

5. In a fruit handling machine, in combination, a rotatable turret, individual fruit supporting cups carried on said turret, stem gripping means for holding the fruit presented thereto in suspended position above said fruit supporting cups, a stripping plate positioned in alignment with said cups and straddling the stem of the suspended fruit for engaging the stem end portion of the suspended fruit, actuating means for moving the stripping plate toward said supporting cups for stripping the fruit from the stem and for placing the fruit into said cups, and means for intermittently rotating the turret in timed relation with respect to the operation of said stripping plate.

6. A stemming mechanism for fruit pitting machines comprising stationary means, pivotally mounted means on said stationary means including a stem engaging portion cooperating with the stationary means for engaging the stem of the fruit presented thereto for holding the fruit in suspended position on the stationary means, movable means associated with the stationary means and extending above the suspended fruit, means for holding the pivotally mounted means and movable means in inoperative position, and means for operating the pivotally mounted means and movable means for locking the stem of the suspended fruit to the stationary means and for shifting the movable means in the direction of the suspended fruit for engaging the same and for stripping the fruit from the stem.

7. A stemming mechanism for fruit pitting machines comprising stationary means, pivotally mounted means on said stationary means including a stem engaging portion cooperating with the stationary means for engaging the stem of the fruit presented thereto for holding the fruit in suspended position on the stationary means, movable means associated with the stationary means and extending above the suspended fruit, means operatively interconnecting the movable means and said pivotally mounted means, means for holding the pivotally mounted means and movable means in inoperative position, and common means for simultaneously operating the pivotally mounted means and movable means for locking the stem of the suspended fruit to the stationary means and for shifting the movable means in the direction of the suspended fruit for engaging the same and for stripping the fruit from the stem.

8. A stemming mechanism for fruit pitting machines, comprising a stationary plate, a pivotally mounted stem locking arm carried by said stationary plate and including a hook portion cooperating with said plate for engaging the stem of the fruit presented thereto for holding the fruit in suspended position on the stationary plate, a serrated movable plate pivotally mounted with respect to the stationary plate and straddling the stem of the suspended fruit to extend over the stem end of the fruit, means for normally holding the stem locking arm and movable plate in inoperative position, and means for operating the locking arm and movable plate for locking the stem of the suspended fruit to the stationary plate and for shifting the movable plate in a direction toward the fruit for engaging the same and for stripping the fruit from the stem.

9. A stemming mechanism for fruit pitting machines comprising a stationary plate, a pivotally mounted stem locking arm carried by said stationary plate and including a hook portion cooperating with said plate for engaging the stem of the fruit presented thereto for holding the fruit in suspended position on the stationary plate, a serrated movable plate pivotally mounted with respect to the stationary plate and straddling the stem of the suspended fruit to extend over the stem end of the fruit, means operatively interconnecting the movable plate and said locking arm, means for normally holding the stem locking arm and movable plate in inoperative position, and common actuating means for simultaneously operating the locking arm and movable plate for locking the stem of the suspended fruit to the stationary plate and for shifting the movable plate in a direction toward the fruit for engaging the same and for stripping the fruit from the stem.

10. A stemming mechanism for fruit pitting machines comprising stationary means, means pivotally mounted on said stationary means including a stem engaging portion cooperating with the stationary means for engaging the stem of the fruit attached thereto and for holding the fruit in suspended position on the stationary means, movable means below the stationary means and extending above the suspended fruit, centering means on said movable means, means operatively interconnecting the movable means and pivotally mounted means, means for normally holding the pivotally mounted means and movable means in inoperative position, and means for simultaneously operating the pivotally mounted means and movable means for locking the stem of the suspended fruit to the stationary means and for shifting the movable means and said centering means in the direction of the suspended fruit for engaging and centering the fruit with respect to said movable means and for stripping the fruit from the stem.

11. In a fruit handling machine a stationary stem support, a movable locking arm cooperating with the stem support for engaging the stem of the fruit to suspend the fruit by its stem from said stem support, a stripping plate normally arranged below the stem support and straddling the stem of the suspended fruit, means mounting the stripping plate for movement downwardly into engagement with the suspended fruit to strip the same from the stem, and common means for operating said stripping plate and locking arm whereby to move the latter away from the stem support after the fruit is stripped from the stem to discharge the severed stem from the stem support.

12. A fruit stemming and orienting device comprising a fruit cup for receiving fruit in a predetermined position and for supporting the same in said position, a stem support for pendently supporting the fruit by its stem centrally above the fruit cup, fruit engaging means normally arranged adjacent the stem support and movable toward the fruit cup, and means for moving the fruit engaging means toward the fruit cup to plumb the stem axis of the fruit with respect to the fruit engaging means, strip the fruit from its stem and force the plumbed fruit into positive engagement with said fruit cup.

13. In a fruit handling machine an orienting means comprising a fruit holder for receiving individual fruit in wedge-like fashion to hold said fruit in the position in which it is received, a stem support axially above the fruit holder for gripping the stem of a fruit and supporting the fruit in suspension on its stem, a stem stripper arranged for reciprocation between the stem support and the fruit holder and normally positioned adjacent the stem support to engage the stem end of the fruit upon downward movement, and means for imparting downward movement to the stem stripper to plumb the fruit relative to the fruit holder and subsequently pull the fruit from its stem while maintaining the fruit in plumbed condition and thereafter positively urge said fruit in plumbed condition into wedging engagement with the fruit holder in said plumbed condition.

14. In a fruit handling machine including a fruit holder having a fruit engaging surface for wedgingly receiving an individual fruit to hold the same in the position in which it is received, stem holding means for pendently supporting the fruit by its stem above said fruit holder, stripping means straddling the stem of the suspended fruit and movable downwardly with respect to the holding means into engagement with the fruit to strip it from its stem and to propel it into wedging engagement with the fruit engaging surface of said fruit holder.

15. In a fruit handling device, an individual fruit holder, a stem supporting plate, a movable stem locking arm cooperating with the stem supporting plate to clamp the stem of fruit presented thereto over said supporting plate and against one side thereof for holding the fruit in suspended position therefrom above the fruit holder, a stripping plate associated with said stem supporting plate and normally spaced above the suspended fruit, means for moving the stripping plate downwardly toward said fruit to engage the stem end of the fruit for transferring said fruit into the fruit holder, and means operatively connecting the stripping plate with the stem locking arm for effecting movement of the latter with said stripping plate thereby imparting downward movement to the stem locking arm to urge the severed stem over the stem supporting plate and downwardly relative thereto for discharging the severed stem therefrom.

16. In a fruit handling device, a stationary stem supporting plate, a stem locking arm movable relative to the stem supporting plate and normally clamping the stem of the fruit over said supporting plate and against one side thereof for holding the fruit in suspended position therefrom, a stripping plate associated with said stem supporting plate and normally spaced above the suspended fruit, means for moving the stripping plate downwardly into engagement with the fruit for stripping the same from the stem, and means operatively connecting the stripping plate with the stem locking arm for effecting downward movement of the latter incident to the operation of the stripping plate to urge the severed stem over the stem supporting plate and downwardly relative thereto for discharging said severed stem therefrom.

17. In a fruit handling machine, an individual fruit holder, stem supporting means arranged to suspend a fruit by its stem above said holder, stripping means cooperating with the stem supporting means and straddling the stem of the suspended fruit, and means for moving the stripping means downwardly against the suspended fruit to strip said fruit from its stem and transfer said fruit to the holder.

18. In a fruit handling machine, an individual fruit holder, stem supporting means arranged to suspend the fruit by its stem above said holder, stripping means cooperating with the stem supporting means to straddle the stem of the suspended fruit, means on the stripping means for centering the fruit with respect to said holding means incident to downward movement of the stripping means toward the fruit, and means for moving the stripping means downwardly against the suspended fruit to strip said fruit from its stem and transfer said fruit to the holding means.

19. In a fruit handling machine, in combination, individual fruit holding means having a fruit engaging surface for wedgingly receiving an individual fruit to hold the same in the position in which it is received, means for engaging the stem of a fruit for holding the latter in suspended position above said fruit holding means, stripping means for engaging the stem end of the suspended fruit adjacent the point of connection of the stem with the fruit to align the stem vertically above the fruit holding means, means for moving the stripping means toward said fruit holding means to align the stem blossom axis of the fruit with respect to the said fruit holding means incident to stripping the fruit from its stem and maintain the stem blossom axis of the fruit aligned with the vertical axis of the fruit holding means while transferring the fruit into wedging engagement with the fruit engaging surface of said fruit holding means.

20. A fruit handling machine comprising means for wedgingly receiving fruit to hold the same in the position in which it is received, means for gripping the stem of a fruit to pendently support the same above the fruit receiving means, means for positioning the fruit end of the stem vertically above the fruit receiving means, and means for moving the stem positioning means with respect to the gripping means to engage the stem end of the fruit and align the stem blossom axis of the fruit with respect to the vertical axis of the fruit receiving means and thereafter push said fruit off its stem and into wedging engagement with said fruit receiving means.

21. A fruit handling machine comprising a fruit holder for supporting a piece of fruit, means for gripping the stem of the fruit and suspending the fruit free of the fruit holder, and means movable with respect to the gripping means for aligning the fruit with its stem blossom axis disposed substantially coincident with the axis of the fruit holder and for pushing the fruit while in said position off its stem and into the fruit holder.

22. A fruit handling machine comprising a fruit holder for supporting a piece of fruit, means for gripping the stem of a fruit presented thereto and suspending the fruit above the fruit holder, and means movable in timed relation to said gripping means for engaging the stem end of the fruit for straightening the stem and for aligning the fruit with its stem blossom axis disposed substantially coincident with the axis of the fruit holder.

23. A fruit handling machine comprising a fruit holder for supporting a piece of fruit, means for receiving the stem of a fruit presented thereto, means for clamping the free end of the stem against the receiving means and suspending the fruit in position above said fruit holder, means straddling the stem of the suspended fruit and movable with respect to said clamping means for engaging the stem end of the suspended fruit to straighten the stem and for aligning the stem blossom axis of the fruit with the axis of the fruit holder.

24. A fruit handling machine comprising a fruit holder for supporting a piece of fruit, means for gripping the stem of a fruit presented thereto and suspending the fruit above the fruit holder, means movable with respect to the stem gripping means for engaging the fruit for stripping it from the stem and for placing it in the fruit holder, said stripping means including a centering surface for aligning the stem blossom axis of the fruit with the vertical axis of the fruit holder and for maintaining the fruit in said aligned position during the placing of the fruit into said holder.

BURTON C. COONS.